United States Patent [19]

Taketomo et al.

[11] Patent Number: 4,671,809

[45] Date of Patent: Jun. 9, 1987

[54] GAS SEPARATION MODULE

[75] Inventors: Eiji Taketomo; Yukiaki Hara, both of Kitakyushu, Japan

[73] Assignee: Nippon Steel Corporation, Tokyo, Japan

[21] Appl. No.: 740,628

[22] Filed: Jun. 3, 1985

[30] Foreign Application Priority Data

Jun. 5, 1984 [JP] Japan ............................. 59-114851
Sep. 25, 1984 [JP] Japan ............................. 59-200311

[51] Int. Cl.⁴ ............................................ B01D 53/22
[52] U.S. Cl. ................................. 55/158; 55/523
[58] Field of Search .............. 55/16, 158, 523, 527; 65/4.3, 12, 108, 110

[56] References Cited

U.S. PATENT DOCUMENTS

| | | | |
|---|---|---|---|
| 2,084,811 | 6/1937 | Keen | 65/110 X |
| 2,087,947 | 7/1937 | Dichter | 65/110 X |
| 2,961,062 | 11/1960 | Hunter et al. | 55/158 |
| 3,019,853 | 2/1962 | Kohman et al. | 55/158 X |
| 3,091,105 | 5/1963 | Morrill | 65/110 X |
| 3,100,868 | 8/1963 | McAfee, Jr. | 55/158 X |
| 3,135,591 | 6/1964 | Jones | 55/158 X |
| 3,262,251 | 7/1966 | Hicks, Jr. | 55/158 |
| 3,269,817 | 8/1966 | Bondley | 55/16 X |
| 3,279,902 | 10/1966 | Gardner | 55/16 X |
| 3,422,008 | 1/1969 | McLain | 55/158 X |
| 3,567,666 | 3/1971 | Berger | 55/158 X |
| 3,652,248 | 3/1972 | Loxley et al. | 65/12 X |
| 3,897,233 | 7/1975 | Szilagyi | 65/110 X |
| 4,092,135 | 5/1978 | Dussaussoy et al. | 55/158 |
| 4,165,224 | 8/1979 | Irven et al. | 65/110 X |
| 4,203,844 | 5/1980 | Amicel et al. | 55/158 X |
| 4,220,535 | 9/1980 | Leonard | 55/158 X |
| 4,427,424 | 1/1984 | Charpin et al. | 55/158 |

FOREIGN PATENT DOCUMENTS

| | | | |
|---|---|---|---|
| 0024718 | 3/1981 | European Pat. Off. | |
| 2140762 | 1/1973 | France | |
| 2437858 | 4/1980 | France | |
| 2451407 | 10/1980 | France | |
| 55-119420 | 9/1980 | Japan | |
| 2040723 | 9/1980 | United Kingdom | 55/158 |

*Primary Examiner*—Robert Spitzer
*Attorney, Agent, or Firm*—Wenderoth, Lind & Ponack

[57] ABSTRACT

A gas separating module which includes a container having a gas inlet and a gas outlet. A bundle of porous material tubes are incorporated in the container and are open at both ends, each of the porous material tubes having a smaller outside diameter at both ends than in the other portions. The porous material tubes fixed to said container at said tapered ends.

16 Claims, 15 Drawing Figures

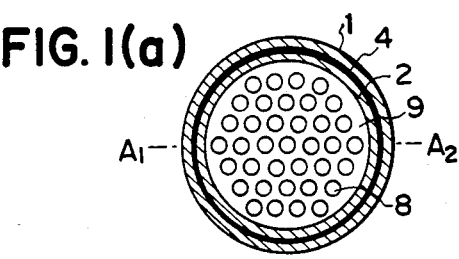
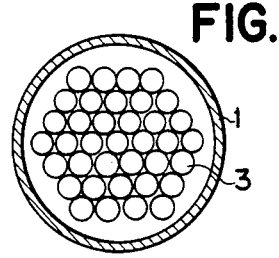
FIG. 1(a)     FIG. 1(b)
FIG. 1(c)
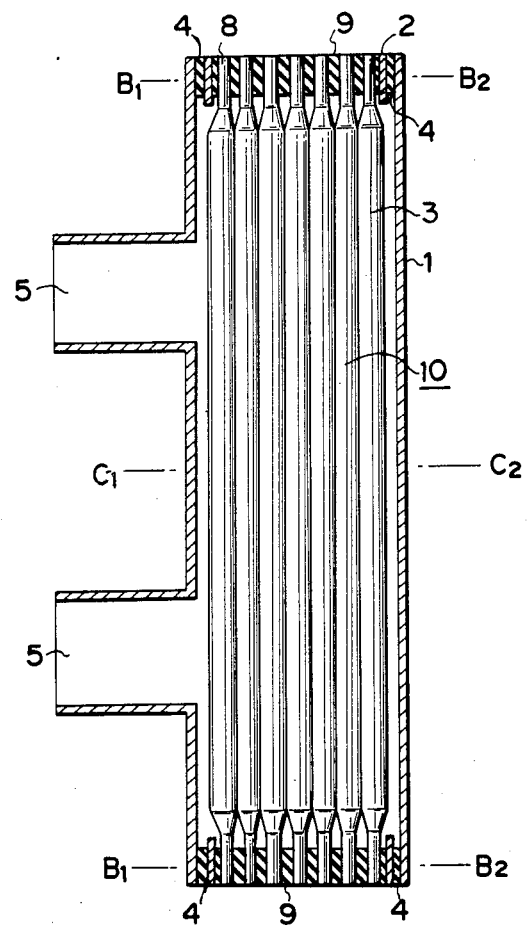
FIG. 2
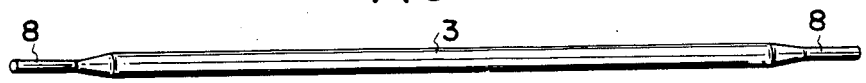

FIG. 8
FIG. 10
FIG. 9
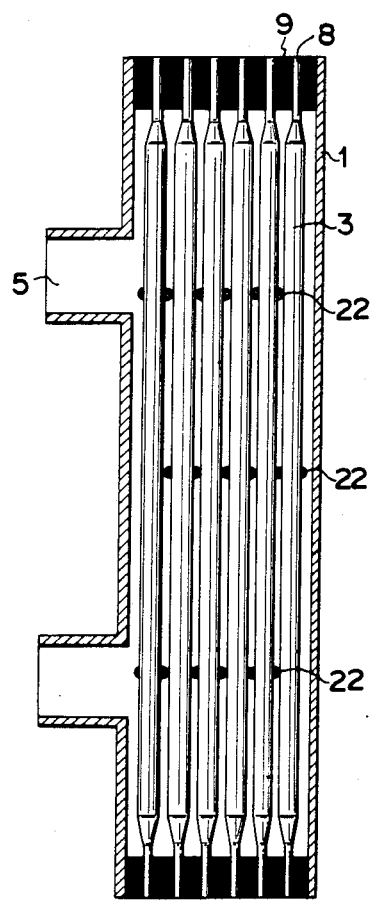
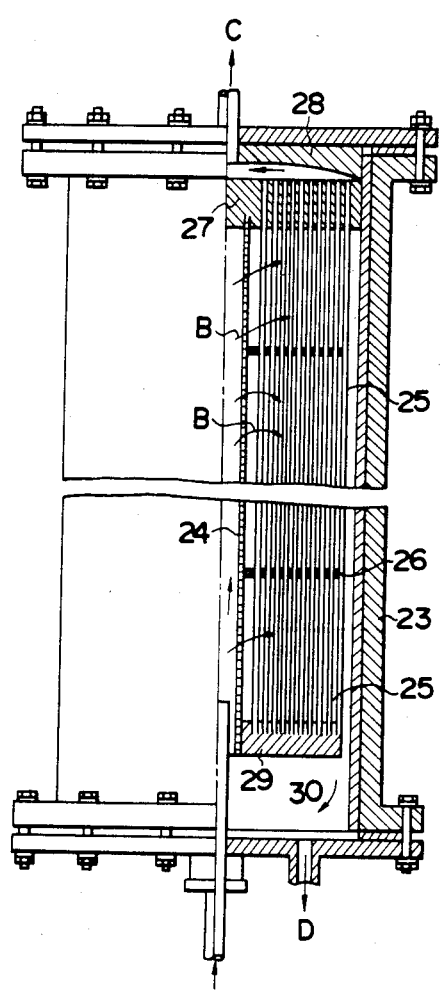
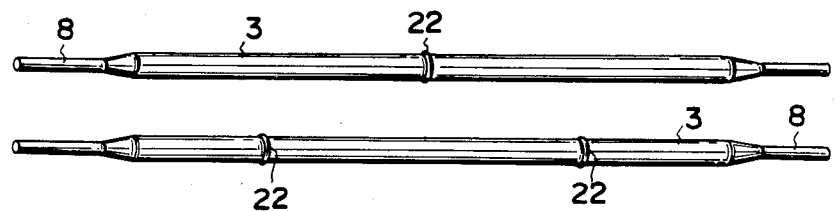

GAS SEPARATION MODULE

BACKGROUND OF THE INVENTION

1. Field of the invention:

Membrane gas separation technology holds promise as inexpensive and energy-saving technology for separatng gasses and active studies are being made to realize industrially feasible processes. Primary to attaining this object is the development of a membrane material having high capabilities of both gas permeation and separation, and the development of a gas separation module that is compact and simple in structure and which is yet inexpensive and highly reliable. The present invention relates to the achievement of the latter requirement.

2. Description of the Prior Art:

Porous membranes are relatively poor in their ability to separate hydrogen from gas mixtures, so the predominant portion of the current R&D efforts on membrane gas separation technology is expended in nonporous polymer membranes. However, membranes of porous inorganic materials used in the separation and concentrating of hydrogen have two advantages not possessed by nonporous polymer membranes, i.e., high heat resistance and high gas permeability. Known porous inorganic membrane materials include porous glass, ceramic sinters and metal sinters, and porous glass is the best material since micro pores having diameters ranging from several tens to hundreds of angstroms can be obtained fairly easily.

A conventional gas separating module using a porous glass membrane is disclosed in Unexamined Published Japanese Patent Application No. 119420/1980. This reference proposes a method of separating and concentrating hydrogen with a module comprising a bundle of porous hollow glass fibers (outside diameter $\leq 2$ mm, wall thickness $\leq 0.8$ mm, pore diameter=20-200 Å) encased within a sheath. In accordance with this method, the flow rate of the hydrogen gas that permeates through the fibers per unit volume is increased by reducing the outside diameter and wall thickness while increasing the number of fibers packed in the sheath. In the Example, there is shown a module consisting of as many as about $2 \times 10^5$ porous glass capillaries (OD=0.3 mm, wall thickness=0.05 mm, average pore dia.=43 Å) incorporated within a metal pipe.

A schematic of this module is shown in FIG. 10; a metal pipe 23 has incorporated therein a fluid distributing pipe 24 and ca. $2 \times 10^5$ porous glass capillaries 25. The capillaries are supported by a sheet 26 at several points along their length so that the individual capillaries are spaced apart by a small distance. The top of the capillaries penetrates through a support 27 and is open to a permeate gas receptacle 28, whereas the bottom of the capillaries is securely embedded in a support 29. The top of the distribution pipe 24 is closed and embedded in the support 27. A feed gas mixture is forced through the distribution pipe 24 and all of the gas is blown against the outer surfaces of the capillaries 25 in the direction indicated by arrow B. In order to ensure that the stream of the gas feed will flow uniformly along the outer surfaces of the capillaries, the distribution pipe must be properly designed and the glass capillaries must also be properly arranged. The hydrogen gas in the feed permeates through the glass capillaries and its concentrate flows in the direction indicated by arrow C and is recovered from the top. The remainder of the feed that does not permeate through the capillaries passes between each capillary and is collected as indicated by arrow D after passing through a space 30.

The module structure shown above has various problems.

The first problem is that a compact structure cannot be realized because the glass capillaries must be packed in the metal pipe in an arrangement other than that of "close packing" in order to provide a sufficient space between each capillary for ensuring a gas passage from the outside to the inside of the capillary.

The second problem is associated with the complexity of the work necessary for securing a multiple of porous glass capillaries with a seal. Utmost care and prolonged time are required for securely attaching the fluid distribution pipe and the great number of glass capillaries to the supports 27 and 29 while arranging them in the proper pattern and without causing damage to any of the capillaries.

The third problem associated with the module is its low durability and heremeticity. One reason for this problem is the high possibility of the porous glass capillaries breaking at the portions embedded within the end seals. Because of their porous nature, the porous glass capillaries are weaker than non-porous glass capillaries. When the module is subjected to temperature cycles, cracks will easily develop in the portions embedded in the end seals because of repeated stress resulting from thermal expansion mismatches between the glass and its supporter, e.g., the sealing material and the metal pipe. This greatly reduces the durability of the module. The other reason for the third problem is that the hermeticity of the module ends is easily impaired. In order to realize efficient gas separation, the space of the outside and the space of the inside of a glass capillary, one side with a higher pressure and the other side with a lower pressure, must be hermetically isolated from each other by the end seals for the glass capillary. However, if several hundreds of glass capillaries are spaced within a metal pipe with the clearance between each capillary held to a minimum in order to obtain a near "close packed" arrangement, air bubbles may be entrapped in the capillary spacing or incomplete sealing of that space may occur, resulting in low hermeticity at the ends of the module.

SUMMARY OF THE INVENTION

The principal object, therefore, of the present invention is to provide a simple and compact gas separating module that has high durability and hermeticity and which can be manufactured at low cost.

This object of the present invention can be achieved by the following:

1. A gas separating module comprising a container having a gas inlet and outlet and a bundle of porous material tubes that are incorporated in said container and which are open at both ends, each of the porous material tubes having a smaller outside diameter at both ends than in the other portions, said porous material tubes being fixed to said container at said tapered ends.

2. A gas separating module according to Paragraph 1 wherein said porous material tubes are bundled together in a closely packed configuration and are fixed at the tapered ends so that a gas component that has permeated through the micro pores in the tubes will flow through the gaps formed between each tube at both ends, as well as through the gaps that run in the longitudinal direction of the tubes and which are formed between the outer surfaces of adjacent tubes in the straight untapered portions.

3. A gas separating module according to Paragraph 1 or 2 wherein the porous material tubes are fixed at both ends with a curable sealing agent.

4. A gas separating module according to any one of Paragraphs 1 to 3 wherein both ends of each of the porous material tubes are fixed by a curable sealant in a short tube which is open at both ends, the short tube being spaced from the inner surface of the container by a certain gap which is filled with a curable sealant.

5. A gas separating module according to Paragraph 1 or 2 wherein the porous material tubes are provided at one end with a passageway for introducing a feed gas and at the other end with a passageway for delivering the gas component that has not permeated through the porous material tubes, said gas separating module being further provided with a passageway that communicates with the interior of the container incorporating the porous material tubes and by means of which the gas component that has permeated through the porous material tubes goes outside the module.

6. A gas separating module according to Paragraph 1 or 2 wherein said porous material tubes are fixed by end plates.

7. A gas separating module according to any one Paragraphs 1 to 6 wherein the porous material tubes are porous glass tubes.

8. A gas separating module according to Paragraph 7 wherein said porous glass tubes have the outside diameter of each of their ends reduced by heat treating until partially melted.

9. A gas separating module according to any one of Paragraphs 1 to 6 wherein said porous material tubes are made of a porous ceramic material.

10. A gas separating module according to any one of Paragraphs 1 to 6 wherein said porous material tubes are made of a sintered metal powder.

11. A gas separating module according to any one of Paragraphs 1 to 8 which comprises a bundle of porous glass tubes incorporated within a tubular metallic container.

12. A gas separating module according to Paragraph 11 wherein said tubular metallic container is equipped with an expansion joint.

13. A gas separating module according to Paragraph 1 or 2 which comprises an elongated tubular metallic container having a gas inlet and outlet and a bundle of porous glass tubes that are incorporated within said container and which are open at both ends, both ends of each of said porous glass tubes which are bound together in a closely packed configuration being fixed with a curable sealant in a short metallic tube which is open at both ends, the outer surface of said short tube being spaced from the inner surface of said container by a certain gap which is closed with a curable sealant, said bundle of porous glass tubes being provided at one end with a passageway for introducing a feed gas and at the other end with a passageway for delivering the gas component that has not permeated through the glass tubes, said container being provided with a passageway that communicates with the interior of the container accommodating the bundle of porous glass tubes and by means of which the gas component that has permeated through the porous glass tubes goes outside the module.

BRIEF DESCRIPTION OF THE DRAWINGS

FIGS. 1(a)–1(c) show the module structure in accordance with the present invention; FIG. 1(a) is a cross section taken on either of lines $B_1$–$B_2$ of FIG. 1(c), FIG. 1(b) is a cross section taken on line $C_1$–$C_2$ of FIG. 1(c), and FIG. 1(c) is a side elevational section of the module which is cut through line $A_1$–$A_2$ of FIG. 1(a);

FIG. 2 is a side view of a single porous material tube of the present invention;

FIG. 3(a) is a cross section showing the plurality of parallel gaps 11 that are formed in the axial direction between the respective outer surfaces of the glass tubes 3 that abut against each other in groups of three, and FIG. 3(b) is a longitudinal section showing a gap 12 formed between the tapered sections of two adjoining glass tubes 3;

FIG. 5(b) is a side elevational section of the module and FIG. 5(a) is a view as seen from the arrow A—A of FIG. 5(b).

FIG. 7(b) is a side elevational section of the module structure and is a cross section taken on line $A_1$–$A_2$ of FIG. 7(a), and FIG. 7(a) is a cross section taken on line $B_1$–$B_2$ of FIG. 7(b);

FIG. 8 shows a module structure in accordance with other embodiments of the present invention;

FIG. 9 shows porous material tubes are equipped with spacers for incorporation in the module shown in FIG. 8; and FIG. 10 shows schematically the gas separating module disclosed in Unexamined Published Japanese Patent Application No. 119420/1980 which is a prior art reference with respect to the present invention.

DETAILED DESCRIPTION OF THE PREFERRED EMBODIMENTS

Figure 3A:
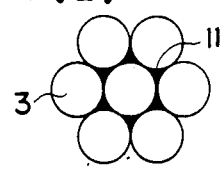
FIGS. 3(a) and 3(b) show a bundle of porous material tubes of the present invention that have tapered ends and are assembled in a close packed configuration.

The construction of the gas separating module in accordance with the present invention is hereunder described by reference to the accompanying drawings.

FIGS. 1(a)–1(c) show one embodiment of the gas separating modules described in Paragraph Nos. 1 to 5 of the above-mentioned SUMMARY OF THE INVENTION. FIG. 1(c) is a side elevational section of the module cut through line $A_1$–$A_2$ of FIG. 1(a). A bundle of porous material tubes 10 is accommodated in a tubular container 1 and is fixed at both ends with curable sealing materials 4 and 9. Fig. 1(a) is a cross section of the module taken on either of lines $B_1$–$B_2$ of FIG. 1(c). Both ends 8 of the bundle of porous material tubes 10 are hermetically fixed in a short tube 2 by being embedded within the sealing 9. The space between the outer surface of the short tube 2 at each end of the bundle of tubes 10 and the inner surface of the tubular container 1 is heremetically closed with the sealing 4. FIG. 1(b) is a cross section of the module taken on line $C_1$–$C_2$ of FIG.

1(c). The individual porous material tubes 3 are bound together in a close packed configuration except for their end portions.

As shown in FIG. 2, each of the ends 8 of the porous material tubes 3 is tapered in outside diameter. Therefore, even if the tubes 3 are assembled in a closely packed configuration as illustrated in FIG. 1(b), a gap is formed between each tube at both ends 8 as shown in FIG. 1(a). This feature of the porous material tubes 3 used in the present invention offers many advantages as will be described later in this specification.

When a gas mixture is fed into the porous material tubes 10 at one end of the tubular container shown in FIG. 1(c), a certain gas component predominantly permeates through the micro pores in the tubes to go outside the tubes and leaves the module at permeate gas outlets 5. The remainder of the gas mixture that has not permeated through the micro pores in the tubes continues to flow through the tubes 3 and is discharged from the module at the other end of the tubular container. By repeating this cycle, efficient separation of a certain gas component from the feed gas is realized.

Figure 7A:
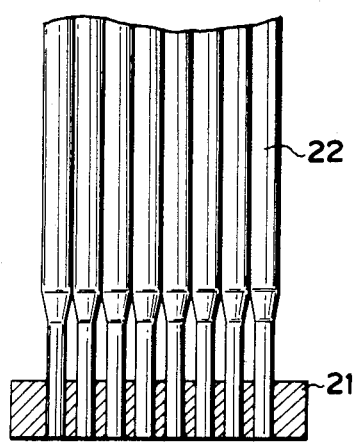
FIGS. 7(a) and 7(b) show a module structure in accordance with other embodiments of the present invention.
Figure 7B:
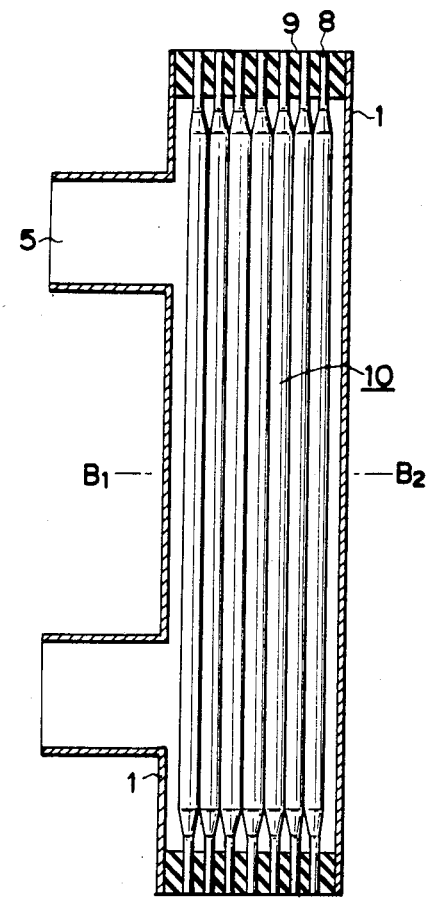

FIGS. 7(a) and 7(b) and 8 show other embodiments of the gas separating module in accordance with the present invention. In the module shown in FIGS. 1(a) to 1(c), each end 8 of the bundled porous material tubes is fixed in the short tube 2 which is further sealed to the inner surface of the tubular container 1. This short tube 2 is not used in the embodiments shown in FIGS. 7(a)(b) and 8, and instead, both ends 8 of the bundle of porous material tubes are directly fixed within the tubular container. Modules such as shown in FIGS. 7(a), 7(b) and 8 can also be used like the module shown in FIGS. 1(a)-1(c) when the gas is used at a normal temperature and in a manner such that the temperature is hardly changed.

In the embodiments shown in FIGS. 1(a)~1(c) and FIGS. 7(a) and 7(b), the porous material tubes are arranged in a closely packed configuration, but this is not so with the module shown in FIG. 8 wherein the tubes are so arranged that a gas passage is provided not only in the radial but also in the axial direction of the tubes. In order to meet this requirement, a spacer 22, for example, a thin wire as shown in FIG. 9, is attached to the periphery of each porous tube at one or more points along its length. The spacer may be a single fiber filament glued onto the periphery of the porous tube.

The configuration shown in FIG. 8 may be adopted in the embodiment shown in FIGS. 1(a)~1(c) wherein both ends of a bundle of porous material tubes are fixed in a short tube which is further sealed to a tubular container to make a completed module. A module incorporating the configuration shown in FIG. 8 wherein porous material tubes each equipped with a very thin spacer are assembled together and are fixed at both ends is less compact than the modules shown in FIGS. 1(a)~1(c) and 7(a) 7(b) where the porous material tubes are arranged in a closely packed configuration and are fixed at both ends. However, even such a module is superior to the conventional product in that its fabrication is easy and that the physical strength of the porous material tubes can be increased at both ends when the porous glass tubes, the outside diameter of each of which is made smaller at both ends than in the remaining portion by the heat treatment, are used as the porous material tubes.

In the gas separating module of the present invention, the outside diameter of each of the porous material tubes incorporated is made smaller at both ends than in the other portions. This tapering of the end of each porous tube has the following advantages.

Figure 3B:
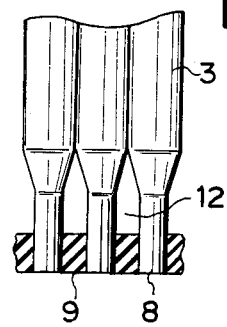

First, a passage for the permeate gas is ensured even if a great number (i.e., several hundreds to thousands) of porous material tubes are bound together in a closely packed configuration. As best shown in FIG. 3(a), a plurality of gaps 11 that run parallel to the longitudinal direction are formed among three adjacent tubes at their straight untapered portions. These gaps extend from top to bottom of the bundle of porous tubes and, as shown in FIG. 3(b), communicate not only with the gaps 12 formed between two adjacent tapered ends of the tubes but also with the space between the tubular container 1 and the bundle of porous tubes 10, thus providing passageways for the gas that has permeated through the tubes. More specifically, the gas that has permeated through the micro pores in the tubes 3 to go outside the tubes flows predominantly through gaps 11 in the longitudinal direction of the tubes, then passes through the gaps 12 at the tube ends 8 and passes in the vicinity of the inner wall of the tubular container 1 to leave the latter at the permeate gas outlets 5. Therefore, a desired number of porous tubes can be assembled in a closely packed configuration without blocking the passage of the permeate gas (i.e., without causing any pressure drop in the stream of that gas), and as a consequence, a high separation efficiency is ensured throughout the operation of the module.

Secondly, the porous material tubes assembled in a closely packed configuration are capable of being hermetically sealed at both ends since a gap is left between porous tubes at their ends. When a liquid curable sealant is used, the porous tubes can be sealed by simply pouring the sealant into the gap between adjoining tubes and curing the same. One does not have to seal a plurality of tubes one by one; instead, a bundle of the tubes can be sealed at a time, thus realizing the fabrication of a complete module at low cost.

Being tapered at both ends, the porous tubes can be bound together in a closely packed configuration with a small gap left between adjoining porous tubes at both ends. Therefore, one may insert the tips of the porous tubes into corresponding holes in fixing plates and then seal only the gap left in the holes so as to provide a bundle of porous tubes fixed at both ends. This embodiment corresponds to that described in the section 6 of the above-mentioned SUMMARY OF THE INVENTION.

Thirdly, the porous material tubes in accordance with the present invention can be assembled in a closely packed configuration, producing a compact gas separation module. The resulting module is so constructed that while a gas mixture to be treated flows into the module at one end and leaves it at the other end, the gas component to be separated permeates through the walls of the porous tubes and, after flowing through the spaces 11 and gaps 12, goes out of the module at the exit 5. Therefore, the module comprising a bundle of closely packed porous tubes is capable of efficient gas separation without experiencing a drop in its performance.

Fourthly, porous glass tubes used as the porous material tubes will aid in fabricating a stronger module because their physical strength can be appreciably increased by reducing the diameter of each of the tube ends through heat treatment.

Table 1 shows that porous glass tubes with strong ends were obtainable when the outside diameter of each end was reduced by heating until it was partially melted.

TABLE 1

| Flame temperature (°C.) | Crushing strength (kg) | Percent reduction in tube diameter |
| --- | --- | --- |
| 1100~1140 | 3.10~5.59 | 20 |
| 970~1000 | 0.93~1.81 | 0 |
| 870~920 | 0.92~1.76 | 0 |
| No heat treatment | 1.02~1.85 | 0 |

Figure 4:
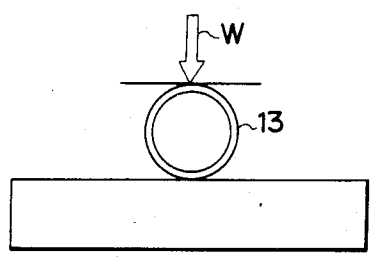
FIG. 4 shows schematically a method for determining the crushing strength of a glass tube.

The data in Table 1 were obtained by the following procedures: porous glass tubes with an outside diameter of 3.5 mm and a wall thickness of 0.4 mm were heated at one end portion 20~25 mm long at varying temperatures. Thereafter, one end of each of the heated tubes was cut off to leave a 10-mm long heated portion, which was placed under radial load as shown in FIG. 4, wherein the glass tube is indicated at 13, and its crushing strength was determined in terms of the load that caused the glass tube to fail. The percent reduction in tube diameter was calculated by measuring the outside diameter of the tube end before and after the heat treatment.

The heat treatment was conducted by rotating the glass tube for 2 minutes with the flame from a gas burner held at a predetermined temperature. The end of the glass tubes treated with a flame at temperatures lower than 1,000° C. had a crushing strength comparable to the untreated tube. The glass tubes treated at 1,100°~1,140° C. had a strength about three times as great as that of the untreated tube. No shrinkage occurred in the tubes that were subjected to the heat treatment at temperatures lower than 1,000° C., but those treated at 1,100~1,140° C. experienced reductions both in the tube diameter and in the wall thickness. On heating the porous glass tubes at one end until they were partially melted, the micro pores in the end collapsed and the diameter of the tube end decreased. This would be the reason why the heat treated tube end exhibited an appreciable increase in crushing strength.

EXAMPLE

A sodium borosilicate glass tube consisting of 62.5% $SiO_2$ 27.3% $B_2O_3$, 7.2% $Na_2O$ and 3% $Al_2O_3$ was heat treated at 540° C. for 80 hrs, acid treated and again heat treated at 850° C. for 10 hrs, so as to fabricate a porous glass tube having an outside diameter of 3.5 mm and a wall thickness of 0.4 mm. Two hundred such porous glass tubes were prepared by the same procedure. Both ends, about 30 mm long, of each porous tube were heat treated with a hydrogen burner (flame temperature: 1,200°~1,300° C.) for 1~1.5 minutes, tapering the outside diameter of each tube end. The so prepared porous glass tubes had a length of 600 mm.

Figure 5A:
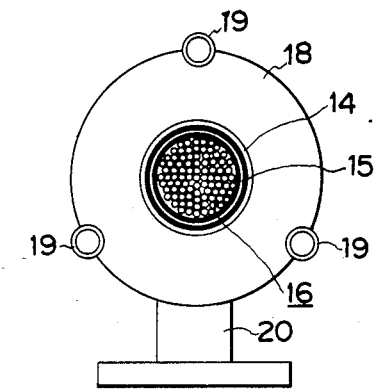
FIGS. 5(a) and 5(b) show a complete gas separation module incorporating the concept of the present invention and using a plurality of porous glass tubes.
Figure 5B:
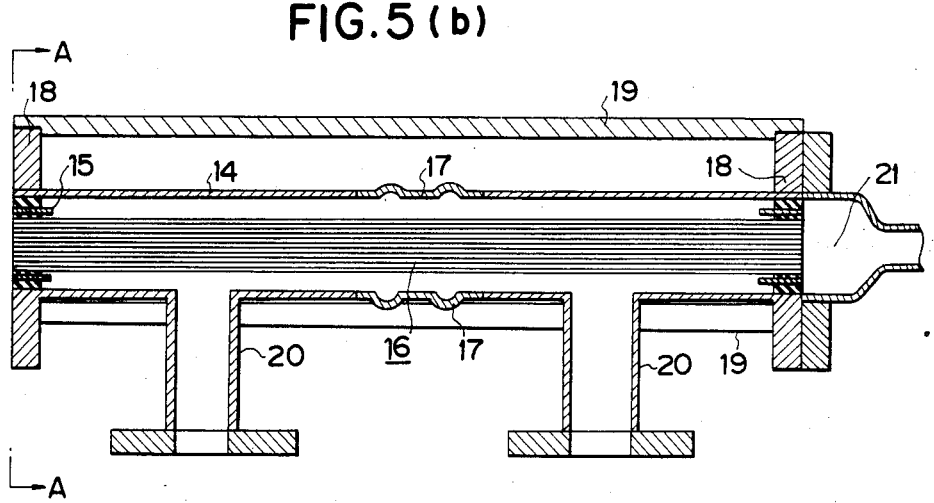

These porous glass tubes were assembled in a gas separating module as illustrated in FIGS. 5(a) and 5(b). The glass tubes were incorporated in a tubular container 14 which was composed of a steel pipe having an outside diameter of 76.3 mm and a wall thickness of 3 mm. Since both ends of each glass tube were tapered, they could be bound together in a closely packed configuration, leaving a gap of a width of 1~1.5 mm between each glass tube at its ends. Both ends of the closely packed glass tubes were inserted into a tubular member 15 made of a short steel tube having an outside diameter of 60.5 mm, a wall thickness of 1.65 mm and a length of 23 mm, and fixed with a curable silicone rubber solution which was poured into the short steel tubes and cured to hermetically seal the gap between each glass tube and the space between the glass tubes and the short steel tube. The resulting bundle of porous glass tubes 16 was inserted into the tubular container 14 and a curable silicone rubber solution was poured into the gap between the outer surface of each short steel tube 15 and the inner surface of the tubular container 14. The rubber solution was cured to seal and fix the bundle of glass tubes 16 to the tubular container 14.

The tubular container 14 was equipped with a central expansion joint 17 and supported by three steel rods 19 that were welded to a flange 18 at both ends of the tubular container 14. The tubular container 14 was equipped in the longitudinal direction with two side pipes 20 having an outside diameter of 60.5 mm and a wall thickness of 2.1 mm. A ribbon heater (not shown) was wrapped around the tubular container 14 so that it could be heated at about 60° C. to avoid the condensation of water in the feed gas. Any strain that would develop by thermal expansion of the heated tubular container 14 was absorbed by the expansion joint 17. Any stress that would result from the thermal expansion mismatch between the bundled glass tubes 16 and the steel tube 14 would be partly absorbed by the elasticity of the silicone rubber that filled the space between the outer surface of the short steel tube 15 and the inner surface of the tubular container 14 at both ends of the bundle of glass tubes, and any stress that would be applied to the short steel tube 15 is dispersed among the large number of porous glass tubes.

In accordance with the module described above, a pressurized gas mixture is fed into the porous glass tubes at one end and flows out of the tubes at the other end. The gas component to be separated permeates through the tube wall and flows out of the module through either one of the two side pipes 20. Both ends of the bundle of glass tubes 16 are provided with a space 21 that communicates with the interior of each glass tube through the flange 18 (only one of the two spaces 21 is shown in FIG. 5(b)). One of the spaces 21 provides a passageway for the gas mixture that is fed into the bundle of glass tubes at one end, whereas the other space 21 serves as a passageway through which the gas component that has not permeated through the glass tube wall flows out of the module. Each of the side pipes 20 attached to the tubular container 14 communicates with its interior and provides a passageway for the gas component that has been separated from the feed gas by permeating through the micro pores in each glass tube.

The advantages of using the gas separating module in accordance with the present invention are summarized below.

The first advantage lies in the simplicity of the module construction. The module is so designed that the gas component to be separated from the feed gas flowing through the porous glass tubes permeates through the tube wall to go outside each glass tube, and this obviates the need for making provision against the formation of uneven gas flow. Because of this simplicity of construction, the module can be fabricated and repaired easily. The glass tubes are tapered at both ends by heat treatment, so they can be assembled together in a closely packed configuration, leaving a gap of a width of only 1~1.5 mm between each glass tube at its ends. This permits the production of a hermetically sealed bundle of glass tubes by simply pouring in a curable liquid sealant.

The second advantage of the module in accordance with the present invention is that it is compact in size because the glass tubes which are tapered at both ends can be assembled in a closely packed configuration. Even if the glass tubes are arranged in a close packed configuration, the module maintains high separation efficiency since the gaps that run parallel to the longitudinal direction of the glass tubes and those gaps which are formed between the tapered end of each glass tube provide passageways for the gas component that has permeated through the glass tube wall.

The third advantage lies in the possibility that a heat-resistant module can be produced. The heat resistance of the module in accordance with the best mode of the present invention recited in the section 13 of the above-mentioned SUMMARY OF THE INVENTION is determined by the heat resistance of the sealing agent used. The curable sealant used in the Example was capable of resisting the temperature of 150°C. Even if a gas mixture as hot as 150° C. is fed in, the module is able to perform satisfactorily since any strain that will result from the thermal expansion mismatch between the glass tubes and the tubular container is absorbed by the expansion joint. Therefore, a further improvement in the heat resistance of the module can be obtained by using a more heat-resistant sealant.

Fourthly, when porous glass tubes are used as in the embodiment shown in FIGS. 5(a) 5(b), their end portions can be made physically stronger by reducing the outside diameter of each tube end by means of heat treatment. This provides a greater reliability for the module both in its fabrication and during the service.

The material that can be used as the porous tube is not limited to the case of such the porous glass. Tubes made of porous alumina or those which are made of sintered metal powders may also be used with equal results if such tubes have a smaller outside diameter at both ends than in the other portions.

Figure 6:
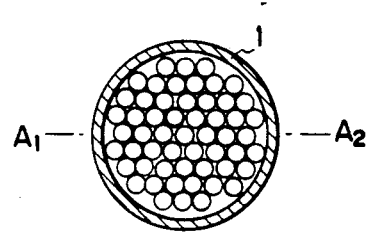
FIG. 6 shows one end of a bundle of porous alumina tubes of the present invention which are fixed in end plates.

FIG. 6 shows an embodiment wherein porous alumina tubes having tapered ends are bundled together by being fixed with end plate 21. The end plate 21 is made of foraminous steel plate; the porous alumina tubes 22 are fitted into the corresponding holes in the steel plate and secured thereto at their ends by means of an adhesive. The resulting bundle of porous alumina tubes is inserted through a tubular container as in the case of FIGS. 5(a)5(b), producing a complete gas separating module.

What is claimed is:

1. A gas separating module, comprising:
   a container having a gas inlet and a gas outlet; and
   a bundle of longitudinally extending porous material tubes, each having means, including opposite, open tapered ends at opposite ends of said bundle, said tapered ends of each porous material tube being tapered to an outer diameter smaller than the outer diameter of said each porous material tube between said tapered ends, for increasing the resistance of the opposite ends of each of said porous material tubes to radial crushing thereof to a level of resistance greater than that of said porous material tubes anywhere between said opposite ends of said porous material tubes, each of said porous material tubes having micro pores therein except in said tapered ends to provide the porosity of said porous material tubes, said bundle of porous material tubes being disposed in said container, each of said porous material tubes being fixed to said container at each of said tapered ends with curable sealing agent.

2. A gas separating module as in claim 1, wherein said porous material tubes are closely packed such that end gaps are formed among said tapered ends and such that longitudinally extending spaces are formed between outer surfaces of adjacent ones of said porous material tubes, said spaces communicating at opposite ends thereof with said end gaps, whereby a gas permeating through said micro pores flows through said gaps and said micro pores.

3. A gas separating module according to claim 1, wherein the porous material tubes are porous glass tubes.

4. A gas separating module according to claim 3, wherein said tapered ends comprise tapered ends of said porous glass tubes having the outside diameter of each of their ends reduced by heat treating until partially melted.

5. A gas separating module according to claim 1, wherein said porous material tubes are made of a porous ceramic material.

6. A gas separating module according to claim 1, wherein said porous material tubes are made of a sintered metal powder.

7. A gas separating module according to claim 1, wherein said bundle comprises a bundle of porous glass tubes and said container comprises a tubular metallic container containing said bundle of porous glass tubes.

8. A gas separating module according to claim 7, wherein said tubular metallic container is equipped with an expansion joint.

9. A gas separating module, comprising:
   a container having a gas inlet and a gas outlet;
   a bundle of longitudinally extending porous material tubes, each having opposite, open tapered ends at oppoosite ends of said bundle, said tapered ends of each porous material tube being tapered to an outer diameter smaller than the outer diameter of said each porous material tube between said tapered ends, said bundle of porous material tubes being disposed in said container, each of said porous material tubes being fixed to said container at each of said tapered ends:
   a curable sealant at both of said opposite ends of said bundle of porous material tubes, fixing each of said porous material tubes at said tapered ends: and
   two short tubes, each open at both ends thereof, one disposed at each of said opposite ends of said bundle so as to surround said tapered ends, each of said short tubes being spaced from an inner surface of said container surrounding said short tubes so as to define a gap therebetween filled with a portion of said curable sealant.

10. A gas separating module as in claim 9, wherein each of said porous material tubes have micro pores therein, said porous material tubes being closely packed such that end gaps are formed among said tapered ends and such that longitudinally extending spaces are formed between outer surfaces of adjacent ones of said porous material tubes, said spaces communicating at opposite ends thereof with said end gaps, whereby a gas permeating through said micro pores flows through said gaps and said micro pores.

11. A gas separating module according to claim 1 or 10, further comprising at one end of said bundle a passageway for introducing a feed gas and at the other end of said bundle a passageway for delivering the gas component that has not permeated through the porous material tubes, said gas separating module being further provided with a passageway that communicates with the interior of the container incorporating the porous material tubes and by means of which the gas component that has permeated through the porous material tubes goes outside the module.

12. A gas separating module according to claim 1 or 10, further comprising end plates at opposite ends of said bundle, said porous material tubes are fixed by said end plates.

13. A gas separating module, comprising:
a tubular metallic container having a gas inlet and a gas outlet; a bundle of closely packed porous glass tubes, each having opposite, open tapered ends, said bundle being disposed in said container, each of said tubes being fixed to said container at each of said tapered ends;
a curable sealant at both ends of said bundle of porous material tubes, fixing each of said tubes at said tapered ends;
two short tubes, each open at both ends thereof, one disposed at each end of said bundle so as to surround said tapered ends, each of said short tubes being spaced from an inner surface of said container surrounding said short tubes so as to define a gap therebetween filled with a portion of said curable sealant;
a passageway for introducing a feed gas, located at one end of said bundle;
a passageway for delivering the portion of the feed gas not permeated through said tubes, located at the other end of said bundle; and
a passageway communicating with the interior of said container containing said bundle, such that the portion of the feed gas permeated through the tubes is directed therethrough to the exterior of said module.

14. A gas separating module as in claim 13, wherein each of said tubes has micro pores therein, said tubes being closely packed such that end gapos are formed among said tapered ends and such that longitudinally extending spaces are formed between outer surfaces of adjacent ones of said tubes, said spaces communicating at opposite ends thereof with said end gaps, whereby a gas permeating through said micro pores flows through said gaps and said pores.

15. A gas separating module as in claim 1, claim 9 or claim 14, wherein the portion of each of said tubes between the respective tapered ends thereof have uniform diameter.

16. A gas separating module, comprising:
a container having a gas inlet and a gas outlet; and
a bundle of longitudinally extending porous material tubes, each having opposite, open tapered ends at opposite ends of said bundle, said tapered ends of each porous material tube being tapered to an outer diameter smaller than the outer diameter of said each porous material tube between said tapered ends, said bundle of porous material tubes being disposed in said container, each of said porous material tubes being fixed to said container at each of said tapered ends, each of said porous material tubes having micro pores therein, said porous material tubes being closely packed such that end gaps are formed among said tapered ends and such that longitudinally extending spaces are formed between outer surfaces of adjacent ones of said porous material tubes, said spaces communicating at opposite ends thereof with said end gaps, whereby a gas permeating through said micro pores flows through said gaps and said micro pores.

* * * * *

UNITED STATES PATENT AND TRADEMARK OFFICE
CERTIFICATE OF CORRECTION

PATENT NO. : 4,671,809
DATED : June 9, 1987
INVENTOR(S) : Eiji Taketomo and Yukiaki Hara It is certified that error appears in the above-identified patent and that said Letters Patent is hereby corrected as shown below:

Column 9, line 54: change "longitudinallv" to --longitudinally--;

Column 10, line 39: change "oppoosite" to --opposite--;

Column 12, line 5: change "gapos" to --gaps--.

Signed and Sealed this

Twenty-sixth Day of April, 1988

Attest:

DONALD J. QUIGG

Attesting Officer      Commissioner of Patents and Trademarks